(12) United States Patent
Ariji et al.

(10) Patent No.: US 8,708,161 B2
(45) Date of Patent: Apr. 29, 2014

(54) POLYVINYLIDENE FLUORIDE HOLLOW FIBER MICROPOROUS MEMBRANE AND PROCESS FOR PRODUCTION OF THE SAME

(75) Inventors: Akihiro Ariji, Shiga (JP); Hideki Yamada, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 1229 days.

(21) Appl. No.: 12/160,031

(22) PCT Filed: Jan. 10, 2007

(86) PCT No.: PCT/JP2007/050113
§ 371 (c)(1),
(2), (4) Date: Nov. 17, 2008

(87) PCT Pub. No.: WO2007/080862
PCT Pub. Date: Jul. 19, 2007

(65) Prior Publication Data
US 2009/0283469 A1    Nov. 19, 2009

(30) Foreign Application Priority Data

Jan. 11, 2006 (JP) .................................. 2006-3652

(51) Int. Cl.
*B01D 63/02* (2006.01)
*B01D 69/08* (2006.01)
*B01D 67/00* (2006.01)
*C02F 1/00* (2006.01)

(52) U.S. Cl.
USPC ............. 210/500.23; 210/500.21; 210/500.42

(58) Field of Classification Search
None
See application file for complete search history.

(56) References Cited

U.S. PATENT DOCUMENTS

| | | | | |
|---|---|---|---|---|
| 4,778,601 A | * | 10/1988 | Lopatin et al. | ........... 210/500.27 |
| 5,022,990 A | * | 6/1991 | Doi et al. | ................. 210/500.42 |
| 5,626,805 A | * | 5/1997 | Meguro et al. | ................. 264/41 |
| 5,834,107 A | * | 11/1998 | Wang et al. | ................. 428/310.5 |
| 7,429,343 B2 | | 9/2008 | Kessler | |
| 2003/0094409 A1 | | 5/2003 | Minegishi et al. | |
| 2004/0023017 A1 | | 2/2004 | Nagoya et al. | |
| 2005/0258101 A1 | | 11/2005 | Minegishi et al. | |
| 2007/0090051 A1 | | 4/2007 | Minegishi et al. | |
| 2008/0210624 A1 | | 9/2008 | Li et al. | |

FOREIGN PATENT DOCUMENTS

| | | |
|---|---|---|
| CN | 1481272 A | 9/2004 |
| CN | 1583232 A | 2/2005 |
| EP | 1413350 | 4/2004 |
| JP | 7173323 | 11/1995 |
| JP | 2003-210954 | 7/2003 |
| JP | 2005-515061 | 5/2005 |
| JP | 2005-146230 | 6/2005 |
| JP | 2005-194461 | 7/2005 |
| WO | WO 03-026779 | 4/2003 |

OTHER PUBLICATIONS

Bottino et al., "The formation of microporous polyvinylidene diflouride membranes by phase separation," J. of Membrane Science, vol. 57, pp. 1-20 (1991).
The Office Action mailed on Feb. 21, 2012 in corresponding Japanese Patent Application No. 2006-3652.

* cited by examiner

*Primary Examiner* — Katherine Zalasky
(74) *Attorney, Agent, or Firm* — Fish & Richardson P.C.

(57) ABSTRACT

This disclosure relates to an anisotropic polyvinylidene fluoride hollow fiber microporous membrane containing a polyvinylidene fluoride resin. The hollow fiber microporous membrane does not include macrovoids, and has mainly a net-like structure. In addition, the hollow fiber microporous membrane has a dense outer layer on an outer surface, and a homogeneous bulk layer that is internally adjacent to the outer layer and has a coarser structure than the outer layer. The porosity of the bulk layer is at least 1.5 times the membrane surface porosity of the outer layer. The dense structure of the outer layer changes substantially discontinuously into the coarse structure of the bulk layer.

7 Claims, 2 Drawing Sheets

POLYVINYLIDENE FLUORIDE HOLLOW FIBER MICROPOROUS MEMBRANE AND PROCESS FOR PRODUCTION OF THE SAME

TECHNICAL FIELD

The present invention relates to a polyvinylidene fluoride hollow fiber microporous membrane and a process for production of the same. More specifically, the present invention relates to a highly anisotropic polyvinylidene fluoride hollow fiber microporous membrane having a net-like structure; and a production method thereof. The membrane is superior in permeability performance and has a sharp separation characteristic, high chemical resistance, and high mechanical strength.

BACKGROUND ART

Microporous membranes are used in many fields. The membrane can be used in fluid treatments as, for example, a supporting base of a reverse osmosis membrane or a nanofiltration membrane, an ultrafiltration membrane, and a microfiltration membrane. In other fields, the microporous membrane is used as a battery separator. The reverse osmosis membrane and the nanofiltration membrane are capable of removing salts and low-molecular-weight organic matter, and therefore are widely used for desalination of sea water or brackish water, in the semiconductor industry, or in ultrapure water production for medical use. Further, the ultrafiltration membrane and the microfiltration membrane have a particle removal characteristic, and are used as a final filter in ultrapure water production, in beer or wine filtration, and for various water and wastewater treatments. Particularly, the use of membranes for water purification has increased, attracting attention.

Water purification using ultrafiltration membranes or microfiltration membranes have easy maintenance and operational management compared with conventionally known slow or rapid filtration methods, and can completely remove Protozoa *Cryptosporidium* and *Giardia*, which have been discussed recently because of their known ability to survive chlorine sterilization. However, the membrane filtering method requires a facility and operational cost proportional to the amount of fresh water generation, and the advantage in scale is small. Hence, membrane filtration actually requires a higher cost for fresh water generation in a large water purification plant than the other purification methods.

The reduction in the cost of fresh water generation can be achieved not only by decreasing the manufacturing cost of the membrane or the module containing the membrane, but also by decreasing the operating pressure or the membrane usage area by increasing the permeability performance of the membrane. In addition, such a membrane filtration method often adopts physical cleaning methods such as back-washing or air bubbling, or chemical cleaning methods using sodium hypochlorite, ozone, acid, alkali surfactants etc., so as to remove contaminants such as fine particles or organic matter. Accordingly, the reduction in the cost of fresh water generation may also be attained by improving the mechanical strength or chemical strength of the membrane to provide a long-life membrane module. Another effective method is decreasing the pore diameter of the surface of the primary membrane through which the raw water is supplied, insofar as the membrane's permeability performance is not impaired, so that membrane clogging is suppressed.

Cellulose acetate resin, polysulfone resin, and polyacrylonitrile resin have been used conventionally as material for ultrafiltration membranes or microfiltration membranes. Recently, a new membrane made of polyvinylidene fluoride resin, which is superior both in mechanical strength and chemical strength, has been developed. Phase separation is often used as a membrane-forming mechanism. As an example of phase separation, Non-patent Document 1 discloses a technique of forming microporous membranes by casting dope solutions obtained by dissolving polyvinylidene fluoride in various kinds of solutions on glass plates, and then dipping the glass plates in cold water. With this technique, when using a water-soluble N-methyl-2-pyrrolidone, which is a good solvent of polyvinylidene fluoride, the resulting membrane has a void structure on the contact surface with water as a result of non-solvent-induced phase separation, and a particle-packaging structure on the glass plates. However, this membrane becomes defective easily, has poor mechanical strength, and requires various controls in the membrane formation that decrease reproducibility in industrial production.

Non-patent Document 1: Journal of Membrane Science, Vol. 57, P. 1-20 (1991)

Another polyvinylidene fluoride microporous membrane production method discloses using thermally-induced phase separation that adopts a γ-butyrolactone or a propylene carbonate serving as a water-soluble latent solvent. The membrane formed by this method has a spherocrystal lamination structure (see Patent Document 1). However, in this structure, the separation depends on the voids between the spherocrystals, and therefore there is a need to precisely control the size of the spherocrystals, which is usually very difficult. Consequently, this structure tends to have a broad separation characteristic. Moreover, in such a structure formed by the bond between spherocrystals, the tensile strength at break and the tensile elongation at break tend to be lower than those having a three-dimensional, net-like structure.

Patent Document 1: Japanese Unexamined Patent Publication No. 2003-320228

Still another polyvinylidene fluoride porous membrane production method discloses the use of thermally-induced phase separation using a water-insoluble latent solvent such as diethyl phthalate or dioctyl phthalate (see Patent Document 2). This method subjects a polymer, a latent solvent, and an inorganic fine powder to melt-mixing, shapes the mixture into a membrane form, and cools the shaped membrane. The latent solvent and the inorganic fine powder are then sequentially extracted to complete a polyvinylidene fluoride porous membrane. This porous membrane does not have a void structure, and has a high tensile strength at break, a high tensile elongation at break, and superior mechanical strength. The porous membrane has a three-dimensional, net-like structure comprised of homogeneous continuous pores. However, the permeability performance of this homogeneous structure membrane significantly decreases as the structure is made denser to further improve the separation performance. Furthermore, this production method causes problematic environmental damage through the use of dioctyl phthalate, a suspected endocrine disruptor, as well as because of the need for an extra solvent or strong alkali to extract the latent solvent or inorganic fine powder. Additionally, there is considerably increased cost due to the many production steps and the solvent isolation process.

Patent Document 2: Japanese Patent No. 2899903

Still yet another vinylidene fluoride microporous membrane production method discloses that the polymer phase forms an isotropic net-like structure, which branches out three-dimensionally in arbitrary directions. In this structure, the void portions are formed between the net-like structure of the polymer phase, and are in communication with each other to form a percolation structure (see Patent Document 3). The average pore size in the surface of this net-like microporous membrane, as measured with a scanning electron microscope, is smaller than the average pore size in the internal structure, and is therefore reportedly able to prevent impurities in the liquid or gas from entering into the membrane. However, there is no teaching of the means for fabricating such a structure.

Patent Document 3: Japanese Unexamined Patent Publication No. H11-319522

Patent Document 4 discloses a technique of forming a separate active layer made of a cross-linked polyamide thin membrane on the outer layer of a polysulfone porous hollow fiber membrane having a net-like structure. However, since this method forms a polyamide thin membrane by way of interfacial polymerization on the outer layer of the polysulfone porous hollow fiber membrane prepared in advance, the membrane material etc. must not be touched until the interfacial polymerization reaction is completed. This is at least one hindrance preventing the method from being performed in an industrial manner. Moreover, since this method forms a thin membrane as a separate post-process on the surface of the previously-formed supporting membrane, there is a greater risk of separation of the thin membrane from the supporting membrane, or a risk of cavity generation.

Patent Document 4: Japanese Unexamined Patent Publication No. H07-284639

DISCLOSURE OF THE INVENTION

Technical Problem

An object of the present invention is to provide a polyvinylidene fluoride hollow fiber microporous membrane having a high permeability performance and separation performance, and is excellent in both mechanical strength and chemical strength; and a process for production of the same.

Technical Solution

The inventors of the present invention conducted an intensive study to attain the foregoing object, and developed an anisotropic polyvinylidene fluoride hollow fiber microporous membrane having the following characteristics.

(1) The hollow fiber microporous membrane does not include macrovoids, and mainly has a net-like structure.

(2) The hollow fiber microporous membrane has a dense outer layer on its peripheral surface and an adjacent homogeneous layer (a bulk layer, hereinafter) inside the peripheral surface, the bulk layer having a coarser structure than the outer layer.

(3) The porosity A of the bulk layer is not less than 1.5 times the membrane surface porosity B of the outer layer.

(4) The microstructure of the outer layer changes substantially discontinuously into the coarse structure of the bulk layer.

Effect of the Invention

The anisotropic polyvinylidene fluoride hollow fiber microporous membrane of the present invention ensures excellent separation performance with its dense outer layer on the peripheral surface, and ensures high permeability performance with its relatively large-diameter pores in the bulk layer, which decrease water-permeable resistance. Further, the anisotropic polyvinylidene fluoride hollow fiber microporous membrane of the present invention has a net-like structure, which ensures superior tensile strength at break and tensile elongation at break. In particular, if the tensile elongation at break is large, for example, 200% or more, the membrane will not be easily broken by back-pressure washing or air bubbling.

BEST MODE FOR CARRYING OUT THE INVENTION

The following explains embodiments of the present invention in detail.

Figure 1:
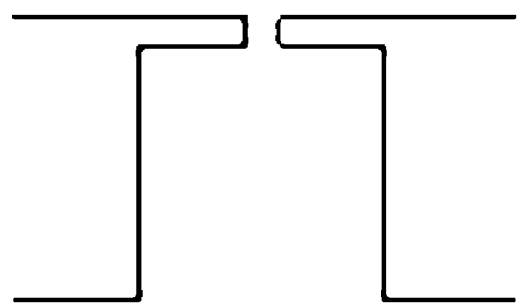
FIG. 1 is a schematic diagram showing a cross-sectional structure of a polyvinylidene fluoride hollow fiber microporous membrane according to the present invention.
Figure 2:
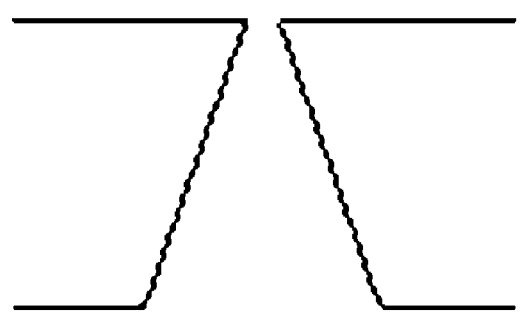
FIG. 2 is a schematic diagram showing a cross-sectional structure of a microporous membrane having an asymmetric structure.
Figure 3:
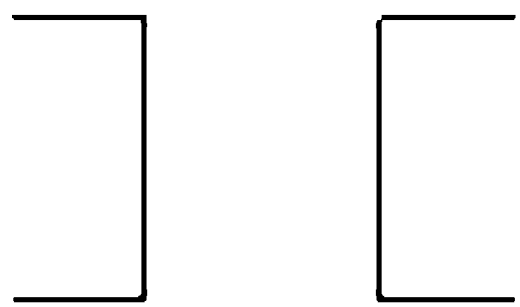
FIG. 3 is a schematic diagram showing a cross-sectional structure of a microporous membrane having a symmetric (homogeneous) structure.
Figure 4:
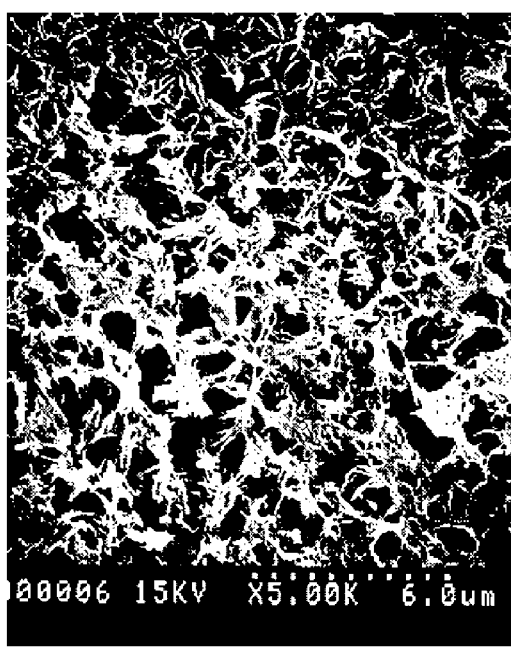
FIG. 4 is an SEM image of a cross-section of a bulk layer, according to one embodiment of the polyvinylidene fluoride hollow fiber microporous membrane of the present invention (bulk layer: porosity=35%).
Figure 5:
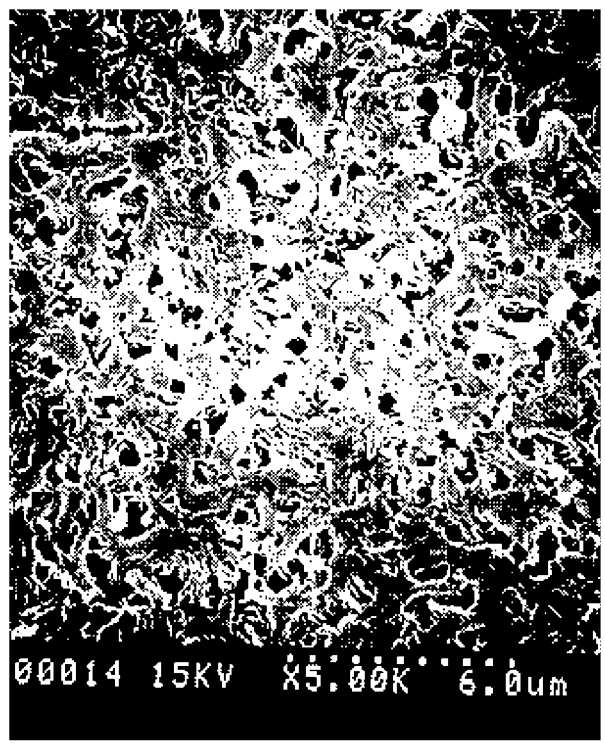
FIG. 5 is an SEM image of a peripheral surface of the hollow fiber microporous membrane of FIG. 4 (membrane surface porosity of the peripheral surface=19%).

FIG. 1 is a schematic diagram showing one embodiment of the present invention, and FIG. 2 is an embodiment of an asymmetric membrane. The following compares these membranes and explains the structure of the polyvinylidene fluoride hollow fiber microporous membrane of the present invention. The structure shown in FIG. 2 is a so-called asymmetric structure, in which the microstructure continuously becomes greater from the membrane surface (the upper face in the figure) to the center of the membrane (downward in the figure). FIG. 3 shows a so-called homogeneous structure, in which the micropore size or the microstructure is even throughout the cross-section of the membrane. However, this structure has a drawback in that the permeable resistance in the thickness direction is large, and the micropore size must be increased more than necessary. This is a disadvantage in the manufacture of a sharp separation characteristic.

In contrast, the hollow fiber microporous membrane of the present invention shown in FIG. 1 has a dense outer layer (the upper surface in the figure) on its peripheral surface, and a layer (a bulk layer, hereinafter) that is immediately adjacent to the outer layer inside the peripheral surface. The bulk layer is homogeneous and has a coarser structure than the outer layer. The outer layer changes substantially discontinuously into the bulk layer. Note that "a substantially discontinuous change" refers to neither the relationship between the porous supporting base and the surface skin, for example, which is seen in the composite reverse osmosis membrane, nor the discontinuous change between the multicoat layers. The hollow fiber microporous membrane of the present invention is formed of a single material or a mixed material, and the discontinuous change of the present invention means a structural change much greater than the continuous change in the asymmetric structure. This structure is provided to simultaneously maintain the sharp separation performance of the dense outer layer and decrease the permeable resistance on the cross-section of the membrane, in order to obtain a high permeability performance. The thickness of the cross-section of the membrane in the dense outer layer is preferably not more than 3 μm, in order to ensure such low permeable resistance. However, to obtain a defect-free outer layer that can exhibit the desired separation performance, the thickness of the outer layer is preferably not less than 0.01 μm. The bulk layer preferably has a small thickness, in order to exhibit a high permeability performance; however, in consideration of the fact that the membrane strength substantially depends on the bulk layer, and that the strength required depends on the target usage of the microporous membrane, the thickness of the bulk layer should be determined comprehensively. To ensure the desired strength, the thickness of the bulk layer is not less than 10 μm, more preferably not less than 50 μm. To ensure the desired permeable resistance, the thickness of the bulk layer is not more than 1,000 μm, more preferably not more than 500 μm. The bulk layer has a homogeneous structure, and the porosity in its central region is preferably not more than 1.5 times, more preferably not more than 1.3 times greater than the porosity of the region right under the outer layer.

As explained above, the dense outer layer of the hollow fiber microporous membrane of the present invention is 3 μm or less, which is very thin. Therefore, in the observation of the cross-section of the membrane using a scanning electron microscope (hereinafter occasionally referred to as an SEM) or the like, it may be difficult to measure a porosity or a pore diameter only with respect to the dense layer. When the measurement fails, the membrane surface porosity or the pore diameter of the membrane surface found by SEM observation may be used as approximate values. The porosity of the bulk layer designates a porosity in the cross-section of the bulk layer except for the dense outer layer that resides within 3 μm from the peripheral surface in the thickness direction. As the structure of the membrane is significantly homogeneous in the thickness direction, any portion of the porosity may be measured. However, in this specification, the porosity consistently refers to a value measured in the vicinity of the center of the thickness direction, unless otherwise specified. To ensure the substantially discontinuous change from the dense structure of the outer layer to the coarse structure of the bulk layer, the porosity A of the bulk layer is preferably not less than 1.5 times, more preferably not less than 1.8 times the membrane surface porosity B of the outer layer. When the porosity A of the bulk layer is less than 1.5 times the membrane surface porosity of the bulk layer, the foregoing condition—"substantially discontinuously change from the dense structure of the outer layer to the coarse structure of the bulk layer in the cross-section"—may not be ensured. In this case, the permeable resistance of the bulk layer is not sufficiently less than the permeable resistance of the dense outer layer; as a result, the high permeability performance, one of the effects of the present invention, is not ensured.

It is not necessary to set the upper limit of the A/B ratio; however, the ratio is preferably not more than 20 times, and more preferably not more than 15 times.

Further, the porosity of the bulk layer and the membrane surface porosity of the peripheral surface may be calculated by way of a general image analysis. More specifically, an image (an SEM image) of the cross-section or the peripheral surface of the hollow fiber membrane is taken at a predetermined magnification, and the image is transferred to a computer using an image capturing device. The image is then divided into a polymer portion constituting the membrane and a void portion or a pore portion using an appropriate threshold value (digitalization). The ratio of the area having the void portion or the pore portion to the entire image is then calculated to find the membrane surface porosity of the outer layer and the porosity of the bulk layer. The porosity of the bulk layer thus found is not necessarily identical to the porosity estimated from the water content; generally, the ratio is smaller than the estimated value. This is because SEM image-taking is incapable of capturing only a completely flat plane, and inevitably captures an image of the structure in the depth direction within a certain focal depth range.

In the hollow fiber microporous membrane of the present invention, the membrane surface porosity of the outer layer is preferably not more than 40%, more preferably not more than 35%, and further preferably not more than 30%. If the membrane surface porosity of the outer layer is greater than 40%, the membrane becomes a homogeneous membrane in which the pore diameter of the outer layer substantially has no large difference from the pore diameter of the bulk layer. In this case, it is difficult to obtain the desired hollow fiber microporous membrane, that is, a hollow fiber microporous membrane superior both in permeability performance and separation performance. Further, as the outer layer becomes denser, the membrane surface porosity of the outer layer becomes further smaller, and the pores may eventually become invisible in an SEM image at the predetermined magnification. In this case, the membrane surface porosity of the outer layer is estimated as 0%. This structure is still allowable if it ensures sufficiently high permeability performance and separation performance in practical application; however, to ensure the particular usefulness of the microporous membrane of the present invention, the membrane surface porosity of the outer layer is preferably 1%. Further, the porosity of the bulk layer preferably ranges from 20 to 60%. If the porosity of the bulk layer is less than 20%, the membrane may become homogeneous as mentioned above, or the pore diameter of the bulk layer becomes denser, which impairs the permeability performance. If the porosity of the bulk layer becomes greater than 60%, the bulk layer cannot substantially serve as a structure supporting base, and the tensile strength at break and/or tensile elongation at break decreases.

In the polyvinylidene fluoride hollow fiber microporous membrane of the present invention, the tensile strength at break preferably ranges from 2 to 20 MPa, and the tensile elongation at break preferably ranges from 200 to 500% per fiber. If the tensile strength at break is less than 2 MPa, the hollow fiber microporous membrane breaks more easily when the membrane module containing the hollow fiber microporous membrane is physically washed by air bubbling or the like. However, if the tensile strength at break is more than 20 MPa, the polymer content in the microporous membrane becomes higher, making the structure denser. In this case, the desired high permeability performance is not ensured. Further, when the tensile elongation at break is less than 200%, the hollow fiber microporous membrane breaks more easily. It is possible to produce a microporous membrane with a tensile elongation at break of more than 500%; however, the tensile strength at break ineluctably decreases. The hollow fiber microporous membrane of the present invention does not have 10 μm or greater macrovoids that cause a decrease in elongation/strength, and instead has, for example, a net-like structure with a matrix of three-dimensionally connected polymers, as shown in FIG. 14. This structure ensures high strength and high elongation even when the polymer amount in the membrane is relatively small. In a microporous membrane comprised of laminations of sphero-crystals, the membrane strength and membrane elongation depend on the bond between the particles. A polyvinylidene fluoride resin is made of micron-order diameter particles, and thereby tends to have a weak bond between the particles. Therefore, compared with a net-like structured microporous membrane having the same polymer concentration, this resin is less reliable in strength or in elongation. It is particularly difficult to ensure 200% or greater tensile elongation at break in the microporous membrane made of laminations of spherocrystals.

The polyvinylidene fluoride hollow fiber microporous membrane of the present invention with such a structure and property ensures both excellent separation performance and high permeability performance, and is superior in mechanical strength and chemical strength. With these properties, the polyvinylidene fluoride hollow fiber microporous membrane of the present invention is suitably used in water-processing fields that require a low-cost, long-life product, such as river-, lake-, or underground water purification for the production of potable water or service water, ultrapure water production for the semiconductor industry, ultrapure water production for medicinal preparations, beverage processing, the post-processing of seawater desalination, or for the disposal of various kinds of drainage and wastewater.

Next, a method of obtaining an anisotropic polyvinylidene fluoride hollow fiber microporous membrane is described below in detail. The polyvinylidene fluoride hollow fiber microporous membrane of the present invention may be produced by a suitable combination of nonsolvent-induced phase separation and thermally-induced phase separation. However, the production is not limited to this method.

Generally, phase separation is suitable for the production of a microporous membrane. Nonsolvent-induced phase separation has a long history of industrial use, particularly for a microporous membrane having an asymmetric structure, as shown in FIG. 1. In nonsolvent-induced phase separation, the dope serving as a membrane-forming liquid typically consists of a polymer, a solvent, and a nonsolvent. The dope is led into a coagulation bath containing a nonsolvent, causing nonsolvent-induced phase separation using the concentration gradient of the dope and the solvent/nonsolvent in the coagulation bath. In this method, a dense surface skin is formed on the outer layer where the phase separation occurs due to the substitution of the solvent and the nonsolvent, and as time passes, the phase separation proceeds into the membrane. As a result, an asymmetric membrane in which the pore diameter continuously enlarges as it goes inside the membrane is formed, adjacent to the dense surface skin.

Recently, thermally-induced phase separation, another method of producing a microporous membrane, has begun to be used more often in the industry. In thermally-induced phase separation, the dope serving as a membrane-forming liquid typically consists of a polymer and a latent solvent. This method is conventionally carried out by discharging a high temperature dope consisting of a polyolefin resin and a water-insoluble latent solvent into cold water. The latent solvent designates a solvent that is not capable of dissolving the polymer component at room temperature, but becomes capable of doing so at a high temperature. The dope containing a polymer and a latent solvent, which have been dissolved and kneaded at a high temperature, forms an even one-phase solution as long as it is kept at a temperature higher than the "cloud point". When the temperature falls below the cloud point, the phase separation occurs, and the liquid is divided into a polymer rich phase and a solvent rich phase. When the temperature further decreases to fall below the crystallization temperature, the polymer matrix is fixed, forming a microporous membrane precursor. The heat transmitting speed in the dope is said to be more than 100 times the diffusion speed of the solvent/nonsolvent. Therefore, in the microporous membrane with a general thickness, by setting the temperature of the cooling bath to fall sufficiently below the crystallization temperature, the phase separation/solidification occurs in the entire membrane depth almost as soon as the dope is cooled. The substitution of the latent solvent and the nonsolvent (water) does not occur in the interface of the dope and the cold water. On the outer layer, only thermally-induced phase separation occurs. As a result, a significantly homogeneous membrane is formed with no large pore size difference between the inner/outer layers and the cross-section of the membrane. However, even in such a two-component system, nonsolvent-induced phase separation can be caused on the outer layer by using, instead of cold water, a nonsolvent that dissolves the latent solvent. For example, nonsolvent-induced phase separation can be caused by dissolving a polyvinylidene fluoride polymer in dioctylphthalate, and leading the solution to a cooling bath containing ethanol, methylene chloride or the like. However, since ethanol or methylene chloride can be dangerous or harmful to the human body, this method is not preferred in terms of environmental load or handling problems.

The inventors of the present invention conducted intensive studies to solve the foregoing problems, and found a novel method for producing a polyvinylidene fluoride hollow fiber microporous membrane. The method is free from the foregoing problems, and forms a membrane having a dense outer layer and pores with the desired diameter. The resulting membrane is excellent both in separation performance and permeability performance, and further excellent in mechanical strength and chemical strength. More specifically, in the present method, a latent solvent, particularly a water-soluble latent solvent, is used to dissolve the polyvinylidene fluoride resin to form the dope. After dissolution and kneading at a high temperature, the obtained dope is discharged from the spinneret, passed through a dry section, and then led to a cooling bath that consists of water or a mixture of water and water-soluble latent solvent, to cause nonsolvent-induced phase separation.

In this production method, on the outer layer of the hollow fiber microporous membrane, the dense outer layer is formed mainly by the nonsolvent-induced phase separation, and the homogeneous bulk layer is formed mainly by the thermally-induced phase separation. In the cooling bath, the nonsolvent-induced phase separation and the thermally-induced phase separation are assumed to occur simultaneously in the contact interface of the high temperature dope and the cooled liquid. In a depth several μm from the contact interface (outer layer) in the dope, the nonsolvent-induced phase separation is dominant, thereby forming a dense outer layer. In the deeper area of the dope, the rate of heat transfer is much faster than the diffusion speed of the solvent/nonsolvent, and the thermally-induced phase separation becomes dominant, thereby forming a bulk layer having a homogeneous structure. The interface between the area where the nonsolvent-induced phase separation was dominant and the area where the thermally-induced phase separation was dominant is assumed to become the border where the dense structure of the outer layer changes into the coarse structure of the bulk layer substantially discontinuously. Further, in the present method, water or a mixed solution of water and water-soluble latent solvent may be used for the cooling bath. Since the power of the concentration gradient causes the diffusion, the degree of fineness or the pore size of the outer layer formed by the nonsolvent-induced phase separation can be adjusted by adjusting the concentration of the water-soluble latent solvent in the cooling bath. In this manner, a polyvinylidene fluoride hollow fiber microporous membrane having the desired separation performance is easily obtained.

The following more specifically explains the method of producing the anisotropic polyvinylidene fluoride hollow fiber microporous membrane according to the present invention. In the present invention, the polyvinylidene fluoride resin refers to one of vinylidene fluoride homopolymer, vinylidene fluoride-hexafluoropropylene copolymer, or a mixture thereof. The polyvinylidene fluoride resin may have any arbitrary weight-average molecular weight; however, a low weight-average molecular weight results in a decrease in dope viscosity. In this case, the hollow state may not be obtained depending on the production condition. For this reason, the weight-average molecular weight is preferably not less than 100,000. In consideration of the strength or durability of the resulting membrane, the weight-average molecular weight is preferably not less than 150,000, and more preferably 200,000. If the weight-average molecular weight is more than 1,000,000, the viscosity of the dope solution becomes excessively high, and the dope solution may not smoothly discharge from a spinneret, or may not dissolve until the temperature becomes very high. For this reason, the weight-average molecular weight is preferably not more than 1,000,000, more preferably not more than 700,000, and further preferably not more than 500,000. An example of the polyvinylidene fluoride resin is SOLEF6020 (registered trademark; Solvay).

In the water-soluble latent solvent according to the present invention, the amount dissolved in water at room temperature is at least 5 wt %, and more preferably 15 wt %. When a latent solvent having a low solubility is used during the cooling bath to introduce the nonsolvent-induced phase separation in the surface of the membrane, the control range of the concentration of the latent solvent in the cooling bath is narrowed. This makes it more difficult to form the desired anisotropic membrane. The latent solvent refers to a solvent that does not dissolve the polyvinylidene fluoride resin at room temperature, but does dissolve it at a high temperature. Examples of the water-insoluble latent solvent include dialkylphthalates such as dimethyl phthalate or dioctyl phthalate, methylisobutylketone, diisobutylketone, cyclohexanone and butyl acetate. However, the solvent must be extracted by another solvent after the membrane formation.

Other examples of the water-soluble latent solvent include propylene carbonate, γ-butyrolactone, and diacetone alcohol. However, the membranes produced using these water-soluble latent solvents have a spherocrystal lamination structure. With this structure, it is difficult to control the size of the spherocrystals, and the resulting membrane has a small tensile elongation at break and low mechanical strength. The water-soluble latent solvent of the present invention is at least one selected from the group consisting of ethylene glycol monomethyletheracetate, ethylene glycol monoethyletheracetate, diethylene glycol monoethyletheracetate, diethyleneglycol monobutyletheracetate, propylene glycol monomethyletheracetate, dipropylene glycol monomethyletheracetate, and triethyl phosphate. Further, a mixture containing a plurality of these water-soluble latent solvents may also be used. These water-soluble latent solvents allow formation of the net-like structure under various conditions, though it depends on the production conditions.

The high temperature dope of the present invention typically consists of a polyvinylidene fluoride resin and a water-soluble latent solvent, and is obtained through stirring and dissolving at a high temperature. The temperature for dissolving the dope varies depending on its composition, and should be determined according to the phase diagram. Accordingly, the dope dissolving temperature is not less than the temperature at which the dope composition is dissolved, and less than the boiling point of the water-soluble latent solvent. Further, it is also necessary to keep the high temperature dope at the cloud point or a higher temperature before the dissolved high temperature dope is discharged from a spinneret. For example, when diethylene glycol monoethyletheracetate is used, dissolution is preferably carried out at 130 to 180° C., though it depends on the concentration of polyvinylidene fluoride resin in the dope. Further, the concentration of the polyvinylidene fluoride resin in the high temperature dope is preferably 15 to 40 wt %, and more preferably 20 to 35 wt %. If the concentration is less than 15 wt %, the viscosity of the dope solution becomes too low, and the hollow fiber membrane is not easily formed. Even if the hollow fiber membrane is somehow formed, the membrane will be defective because of insufficient strength or the like. If the concentration is higher than 40 wt %, the viscosity of the dope solution becomes too high to discharge the liquid via a spinneret. Even if the liquid is somehow discharged, the porosity will decrease and the permeability performance will be significantly impaired. Further, with such a high concentration, the particles do not form a net-like structure in some cases, when dissolved in a certain kind of solvent; instead, they are combined together in the resulting membrane. In this case, the fractional performance and the strength/elongation of the membrane significantly decrease.

As described, the dope solution of the present invention typically consists of two components; however, insofar as the effect of the present invention is not impaired, a nonsolvent, an antioxidant, a plasticizer, a surfactant or the like may be added.

The hollow fiber membrane of the present invention may be formed using a coaxial double-slit spinneret or a spinneret having circular slits, such as a C-shape spinneret. When using the coaxial double-slit spinneret, the dope is pushed outside through the outer slit, while the hollow-forming material, such as a gas or a liquid, is pushed outside through the inner slit. Suitable hollow-forming gases include, but are not limited to, air and nitrogen gas. The hollow-forming liquid preferably has a boiling point at least higher than the temperature of the spinneret, and does not dissolve the polyvinylidene fluoride resin around the temperature of the spinneret. Suitable examples of the hollow-forming liquid include ethylene glycol and polyethylene glycol. Further suitable hollow-forming liquids are liquids that remain in liquid form under room temperature, such as ethylene-glycol, diethylene-glycol, triethylene-glycol, tetraethyleneglycol, PEG400, or PEG600. With the use of such liquids, the speed of mixing/diffusion with the latent solvent becomes relatively low; therefore, the resulting inner surface of the hollow fiber membrane is not dense, and a desirable permeability performance is obtained. Note that the inner surface of the membrane can be made dense by using a hollow-forming material that is more readily mixed and diffused in the latent solvent. However, N-methyl-2-pyrrolidone or dimethylacetoamide, solvents for a polyvinylidene fluoride resin, are not preferred even though their boiling points are higher than the temperature of the spinneret. This is because this solvent will immediately dissolve as it comes out of the spinneret, and the desired hollow fiber membrane shape will not be obtained. As a spinneret having circular slits, a C-shape spinneret with only one bridge to connect the slits, as well as a spinneret with multiple bridges, such as a tripartite arc spinneret, may be used.

The high temperature dope discharged from the spinneret passes through an air gap, led to the cooling bath consisting either of water, or water and a water-soluble latent solvent. The length of the air gap cannot be specifically defined because it involves the fiber forming speed. However, the length preferably falls within a range from several mm to 30 cm. By increasing the length of the air gap, the solvent vaporizes through the dope surface, increasing the resin concentration, and thereby becoming more likely to form a dense outer layer. Further, it is also possible to keep the atmosphere of the air gap at a certain temperature/humidity, for example, by sending a certain amount of air adjusted in temperature/humidity, or by providing a partition to separate the space between spinneret and the cooling bath from atmosphere so that the discharged dope is not in direct contact with ambient air.

The cooling bath preferably consists of either water or a mixed solution of water and a water-soluble latent solvent. The concentration of the water-soluble latent solvent in the mixed solution depends on the type or the water solubility of the water-soluble latent solvent. The concentration of the water-soluble latent solvent is preferably less than 80 wt %, more preferably not more than 75 wt %, and further preferably not more than 70 wt %. If the concentration is 80 wt % or greater, the thermally-induced phase separation becomes dominant in the hollow fiber membrane outer layer even when using, for example, diethylene glycol monoethyletheracetate that freely mixes with water, and the membrane surface porosity of the outer layer of the hollow fiber membrane becomes almost the same as the porosity of the cross-section of the bulk layer. In contrast, if the concentration is less than 80 wt %, the substitution between water and the water-soluble latent solvent immediately occurs in the outer layer of the hollow fiber membrane, and the nonsolvent-induced phase separation becomes dominant, while the thermally-induced phase separation is dominant inside the membrane. As a result, an anisotropic microporous membrane in which the porosity of the bulk layer is greater than the membrane surface porosity of the outer layer is formed. Further, when using dipropylene glycol monomethyletheracetate whose solubility is 19 g with respect to long of water (water-solubility=about 16 wt %), the cooling bath preferably consists of water or an aqueous solution containing less than 10 wt % of water-soluble latent solvent, in order to bring about nonsolvent-induced phase separation in the outer layer of the hollow fiber membrane. Further, insofar as the effect of the present invention is not impaired, various additives or modifiers may be added to the cooling bath. For example, the polyvinylidene fluoride hollow fiber microporous membrane of the present invention can be given hydrophilicity as follows. A surfactant or a hydrophilic polymer such as polyvinyl alcohol or polyvinylpyrrolidone is dissolved in the cooling bath, and the microporous membrane is soaked in the bath.

As is readily understood with reference to the described mechanism of the thermally-induced phase separation, the temperature of the cooling bath is less than the lesser of the crystallization temperature of the polyvinylidene fluoride resin in the dope composition used for the manufacture of the membrane and the boiling point of the liquid used for the cooling, and higher than the solidification temperature of the cooling liquid. The temperature is set appropriately within this range to ensure the desired membrane structure. However, if the cooling bath has an extremely high or low temperature, a great deal of energy will be required to maintain the temperature. Particularly, maintenance of a high temperature causes significant moisture evaporation, and may affect the atmosphere of the air gap between the spinneret and the cooling bath, or inevitably vary the concentration of the water-soluble latent solvent in the cooling bath. To avoid such a risk, the temperature of the cooling bath is preferably 5° C. to 80° C., more preferably 10° C. to 60° C.

The cooling bath and the subsequent washing with water are preferably carried out with clean water purified by a combination of reverse osmosis membrane filtration, ultrafiltration, microfiltration, ion exchange, activated carbon and the like. This is because general industrial water or tap water contains many fine particles; the membrane manufactured with such water is significantly contaminated by the fine particles, and sufficient permeability performance is not obtained. Such a membrane does not have quality as a product.

Insofar as the effect of the present invention is not impaired, the bundles of hollow fiber membranes thus obtained may be subjected to various post-processing techniques, such as annealing, which soaks the membranes in hot water. Though annealing shrinks the hollow fiber membranes in the longitudinal direction by several percentages, the hollow fiber membrane after annealing seldom changes in size even with repeated drying and wetting. Further, the membrane also becomes immune to any performance or property changes with time, and serves as a product of stable quality. As with the washing with water, the annealing is preferably carried out using clarified water for at least 1 minute, at a temperature not less than 90° C. However, the annealing conditions may vary.

Further, the hollow fiber membrane may be subjected to various processes. For example, the membrane surface may be chemically modified to be given hydrophilicity, a polymer having a hydrophilic group may be applied to the membrane and fixed thereto, or a surfactant or various hydrophilic compounds may permeate the membrane surface. As a specific example, hydrophilicity is given by irradiating the hollow fiber membrane with plasma in the presence of oxygen gas, nitrogen gas, or carbon dioxide, so as to supply a —COOH group, an —OH group, or an —$NH_2$ group. Further, a hollow fiber membrane containing active species as a result of irradiation with plasma or X-ray is soaked in a monomer aqueous solution containing a hydrophilic group to induce graft polymerization. Alternatively, the membrane is brought into contact with R—OH(R: alkyl group) at a high temperature in the presence of NaOH so that an —OR group is introduced in the polymer chain. As another example, in the method of applying a polymer containing a hydrophilic group, polyvinyl alcohol or polyvinyl pyrrolidone is used as a hydrophilic polymer. The usage of polyvinyl alcohol depends on the degree of polymerization or the saponification degree. For example, when using highly saponified polyvinyl alcohol, a polyvinyl alcohol aqueous solution is applied on the surface of the hollow fiber membrane, and the application layer is dried at an appropriate temperature to make the polyvinyl alcohol insoluble. In this way, the polyvinyl alcohol is fixed to the hollow fiber membrane. When using lightly saponified polyvinyl alcohol, for example, a polyvinyl alcohol aqueous solution containing glyoxal or the like as a cross-linking agent is applied to the surface of the hollow fiber membrane, and the application layer is dried at an appropriate temperature. The method of permeating a surfactant or a hydrophilic compound does not give permanent hydrophilicity to the membrane; however, such previous processing eliminates the labor involved when making the membrane hydrophilic at the actual work site using an alcohol aqueous solution or the like when the dried hollow fiber membrane becomes commercially available. Because of this benefit, this processing method has been widely adopted. Various surfactants may be selected for use in this method. Examples of typical surfactants include anionic surfactants such as alkyl sulfonate or alkyl benzene sulfonate; a cationic surfactant including quaternary ammonium salt; and nonionic surfactants such as polyoxy ethylene sorbitan alkylates or polyoxy ethylene alkylphenols.

The performance and form of the polyvinylidene fluoride hollow fiber microporous membrane of the present invention thus obtained are suitable for various water-processing purposes. The microporous membrane may be used with any one of outside-in filtration, inside-out filtration, or suction filtration. In the microporous membrane of the present invention, the dense layer is generally formed as an outer layer on the peripheral surface; however, it is also possible to provide the dense layer on the inner surface for an inside-out filtration unit, thereby forming a so-called "double-skin hollow fiber microporous membrane". The inner and outer diameters of the hollow fiber membrane can be arbitrarily set according to the target usage form. For example, if the unprocessed raw water is relatively clean, and intense washing, such as air bubbling, is not required, the internal and outer diameters of the membrane are set to small values so that a wide membrane area is ensured inside the module. However, since the processing accuracy for spinnerets is limited, diameter reduction is restricted to some extent. If the unprocessed raw water contains a large amount of suspensoids, and intense washing, such as air bubbling, is required, the outer diameter and the thickness of the membrane are set to large values, so as to increase the rupture strength. If the unprocessed raw water has a high viscosity, the liquid flow pressure loss inside the hollow fiber membrane increases. To solve this problem, some arrangement can be used to increase the inner diameter. However, an increase in the inner or outer diameter may cause breakage of the hollow fiber membrane or flatten the membrane when the membrane is turned by a guide or a roller, and a larger roller will increase manufacturing facility costs. Therefore, the outer diameter of the polyvinylidene fluoride hollow fiber microporous membrane of the present invention is preferably 100 μm to 5 mm, more preferably 300 μm to 3 mm, and the inner diameter is preferably 50 μm to 4 mm, more preferably 200 μm to 2 mm.

The polyvinylidene fluoride hollow fiber microporous membrane of the present invention may be used as an ultrafiltration membrane or a microfiltration membrane. The pore diameter of the microporous membrane may be measured in various ways, for example, a method using an SEM image, or a half-dry method (ASTM F316-86). These methods are suitable to measure a 0.1 μm or greater pore diameter of a microfiltration membrane. For a membrane less than 0.1 μm in pore diameter, the accuracy decreases or measurement is not possible. In the present invention, the rejections of several Uniform Latex particles with different diameters are measured, and the diameter of a 90% rejected Uniform Latex particle is used to determine a pore diameter of the microporous membrane. As described above, the structure of the peripheral surface of the microporous membrane can be arbitrarily controlled by changing the water-soluble latent solvent concentration in the cooling bath or the temperature of the cooling bath. Further, by appropriately combining the various conditions, such as the type of the polymer, degree of polymerization, or the type of the water-soluble latent solvent, a microporous membrane with the desired pore diameter can be produced. The pore diameter of the microporous membrane thus produced preferably ranges from 0.005 μm to 1 μm, more preferably from 0.01 μm to 0.5 μm.

Further, the polyvinylidene fluoride hollow fiber microporous membrane of the present invention is characterized by a high permeability performance. A membrane having a pure water permeability less than 1 m$^3$/(m$^2$ per day)/100 kPa with respect to 25° C. water is not practical, because it requires high supply pressure or a large membrane area. Further, to ensure a pure water permeability of 1,000 m$^3$/(m$^2$ per day)/100 kPa or greater, the pore diameter of the membrane needs to be increased. In this case, for example, when the membrane is used in the water purification field, bacterias or suspensoids leak and mix with the filtered water. To ensure the desired permeability performance, the pure water permeability of the polyvinylidene fluoride hollow fiber microporous membrane of the present invention ranges from 1 m$^3$/(m$^2$ per day)/100 kPa to 1,000 m$^3$/(m$^2$ per day)/100 kPa, more preferably from 3 m$^3$/(m$^2$ per day)/100 kPa to 500 m$^3$/(m$^2$ per day)/100 kPa with respect to 25° C. water.

EXAMPLES

The following describes Examples of the present invention. However, the present invention is not limited to these Examples.

First, the following shows how to measure the various properties and performances of the hollow fiber membranes according to Examples and Comparative Examples.

Observation of Cross-Section and Outer Layer of the Membrane

The observation of the cross-section and the outer layer of the hollow fiber membrane was carried out using a Hitachi scanning electron microscope S-2500. A wet cross-section sample of the hollow fiber membrane was prepared by cleaving, using tweezers, a membrane frozen by liquid nitrogen. The prepared sample of the cross-section and outer layer of the membrane set on the sample stage of the SEM were then fully air-dried, subjected to sputtering using a Pt/Pd alloy under an appropriate condition, and then observed through the SEM. First, at 1,000× magnification, the existence of 10 μm or greater macrovoids on the cross-section of the hollow fiber membrane was examined. Further, at 3,000 to 5,000× magnification, the cross-section structure of the hollow fiber membrane was examined, the structure of the bulk layer was determined, and the existence and thickness of the dense outer layer was examined. Further, also at 3,000 to 5,000× magnification, the structure of the outer layer was examined. The magnification in such observation examination is set appropriately within the foregoing range depending on the structure of the hollow fiber membrane to be examined. For example, a high magnification is used to observe a fine structure. Though the state where the fine structure of the outer layer changes substantially discontinuously into the coarse structure of the bulk layer is often distinctly visible in an SEM image, the final determination was made by confirming the condition: A/B≥1.5 times, according to the porosity A of the bulk layer and the membrane surface porosity B of the outer layer. This measurement method is explained below in detail.

Measurement Method of Porosity of the Bulk Layer and Membrane Surface Porosity of Outer Layer The cross-section and the outer layer of the hollow fiber membrane were examined at a magnification of 3,000 to 5,000× according to the foregoing method, and an SEM image was obtained. The SEM image was captured by a commercially available scanner to be transferred to a computer, and the loaded image was analyzed with image analyzing software (Media Cybernetics image analyzing software: Image-Pro Plus Version 4.0 for Windows®). In analyzing the image, the membrane was divided by digitalization with an appropriate threshold into a polymer portion constituting the membrane and the void or pore portion, and the area ratio of the void or pore portion to the ratio of the entire image was calculated to find a porosity A of the bulk layer and the membrane surface porosity B of the peripheral surface.

Measurement Method for Pure Water Permeability

A small-scale module was made to measure the pure water permeability. The housing of the module was the same as that used for a general dialyzer. Several or several tens of dry hollow fiber membranes were placed in the housing, with both ends adhered with a urethane resin to seal the fiber membrane liquid-tight. One of the ends is kept sealed by the urethane resin, while the other is cut to make an opening in the hollow fiber membrane, thereby forming a module with an open end in which the effective length of the hollow fiber membrane is about 20 cm. Before measuring the pure water permeability, the created small module was filled with a 50 wt % ethanol aqueous solution for 30 minutes to wet the hollow fiber membrane. Then, the membrane was methodically rinsed with clarified water having been purified using a reverse osmosis membrane filtration device. The module was supplied with clarified water at a water supply pressure of approximately 100 kPa. The water had been adjusted to 25° C. and a turbidity of not more than 0.005 after purification with a reverse osmosis membrane filtration device. After water was supplied for 10 minutes, the water supply pressure, the filtration water pressure, and the filtration water amount were measured. A cross-flow outside-in filtration was used in this measurement. The pure water permeability (m³/(m² per day)/100 kPa) was found according to Formula 1, per 1 m², per day, and per 100 kPa.

pure water permeability=filtration water amount/time taken to obtain filtered water/effective membrane area/(water supply pressure-filtration water pressure). Formula 1

Measurement Method for Uniform Latex Rejection

The same measurement of the pure water permeability as above was performed using a liquid in which Uniform Latex particles were dispersed in clarified water, instead of using clarified water. The polystyrene uniform latex used in this measurement had a diameter of 0.021 µm, 0.028 µm, 0.039 µm, 0.049 µm (all Magsphere, Inc.), 0.083 µm (Dow Chemical Company), 0.112 µm, 0.193 µm (Seradyn, Inc.), and 0.394 µm (Dow Chemical Company).

A 10% Uniform Latex suspension (undiluted liquid) was diluted to 1/10000 by clarified water to produce a solution having a polystyrene concentration of about 10 ppm. The solution was used as raw water to be subjected to the measurement of the rejection. The concentrations of the filtered water and the raw water may be easily found by a general ultraviolet absorptiometer. More specifically, the absorbency for 220 nm wavelength was measured for the particles less than 0.1 µm in diameter, and the absorbency for 230 nm wavelength was measured for the particles equal to or more than 0.1 µm in diameter; then, the concentrations of the filtered water and the raw water are found based on an analytical curve, which is prepared in advance according to a relationship between absorbency and concentration of the solution for each particle diameter.

The rejection(%) of Uniform Latex particles was calculated according to the following Formula 2.

Uniform Latex rejection(%)=(1−(concentration of Uniform Latex in filtered water/concentration of Uniform Latex in raw water))×100 Formula 2

Measurement Method for Tensile Elongation/Strength at Break

To find the elongation/strength of the hollow fiber membrane, a single dry hollow fiber membrane was cut into a 10 cm strip, and the strip was attached to a Tensilon multipurpose testing machine (UTMII: product of Toyo Baldwin Co.), keeping the strip strained between the chucks (interval=5 cm). Under 20±5° C. and 60±10% RH, the hollow fiber membrane strip was pulled at a crosshead speed=10 cm/min until breaking, and the load and displacement on the breakage were measured. The tensile strength at break was calculated according to Formula 3, and was recalculated on the basis of "Pa".

Tensile strength at break=load on the breakage/sectional area of hollow fiber membrane, wherein the sectional area of hollow fiber membrane= (second power of outer diameter−second power of inner diameter)×π/4 Formula 3

Further, the tensile elongation at break (%) was calculated according to Formula 4.

Tensile elongation at break (%)=(displacement on the breakage/interval between chucks)×100 Formula 4

Example 1

20 wt % of a polyvinylidene fluoride resin (SOLEF6020®; Solvay) was dissolved in 80 wt % of diethylene glycol monoethyletheracetate by stirring under nitrogen atmosphere at 148° C., thereby obtaining a high temperature dope. The obtained high temperature dope was ejected from a coaxial double-slit spinneret together with triethylene glycol, which served as a hollow-portion-forming agent. Through an air gap of about 15 mm, the dope was led to a cooling bath consisting of a 10° C. aqueous solution containing 60 wt % of diethylene glycol monoethyletheracetate to be solidified. The resulting fiber was wound at 5 m/min to obtain a hollow fiber membrane. The obtained hollow fiber membrane was washed with water to completely remove the solvent, and then dried to obtain a hollow fiber membrane 1.3 mm in outer diameter and 0.7 mm in inner diameter.

The hollow fiber membrane was observed with a scanning electron microscope (an SEM, hereinafter). A net-like structure was seen in the cross-section of the membrane, and there were no 10 µm or greater macrovoids. A dense layer was formed on the peripheral surface with a depth of about 1 µm, and a homogeneous bulk layer was formed in the rest of the depth of the membrane to reach the inner surface. The porosity A of the bulk layer was 56%, and the membrane surface porosity B of the peripheral surface was 33%; that is, A was 1.7 times B. It was observed that the dense outer layer changed substantially discontinuously into the bulk layer. The pure water permeability was 183 m³/(m² per day)/100 kPa at a water temperature of 25° C. The rejection of the Uniform Latex particle 0.193 µm in diameter was 96.0%, and the rejection of the Uniform Latex particle 0.112 µm in diameter was 6.3%. The separation performance was thus very significant. The tensile strength at break was 2.5 MPa, and the tensile elongation at break was 425%.

Comparative Example 1

The same process as in Example 1 was performed to obtain a hollow fiber membrane 1.3 mm in outer diameter and 0.7 mm in inner diameter, except that the concentration of diethylene glycol monoethyletheracetate in the cooling bath was 80 wt %. The resulting hollow fiber membrane was observed with an SEM. A net-like structure was seen in the cross-section of the membrane, and there were no 10 µm or greater macrovoids. However, the formed membrane was homogeneous in that the outer layer and the bulk layer had no significant structural differences. The porosity A of the bulk layer was 48%, and the membrane surface porosity B of the peripheral surface was 38%; that is, A was 1.3 times B. The pure water permeability was 324 m³/(m² per day)/100 kPa at a water temperature of 25° C., which is very large; however the rejection of the Uniform Latex particle 0.394 μm in diameter was only 8.4%. The tensile strength at break was 1.5 MPa, and the tensile elongation at break was 235%. The strength of the membrane was thus low.

Comparative Example 2

45 wt % of a polyvinylidene fluoride resin (SOLEF6020®) was dissolved in 55 wt % of diethylene glycol monoethyletheracetate by stirring under nitrogen atmosphere at 160° C., thereby obtaining a high temperature dope. The obtained high temperature dope was ejected from a coaxial double-slit spinneret together with triethylene glycol, which served as a hollow-portion-forming agent. Through an air gap of about 15 mm, the dope was led to a cooling bath consisting of a 10° C. aqueous solution containing 60 wt % of diethylene glycol monoethyletheracetate to be solidified. The resulting fiber was wound at 5 m/min to obtain a hollow fiber membrane. The obtained hollow fiber membrane was washed with water to completely remove the solvent, and then dried to obtain a hollow fiber membrane 1.3 mm in outer diameter and 0.7 mm in inner diameter.

The hollow fiber membrane was observed with an SEM. The net-like structure was not seen in the cross-section of the membrane, and the observed structure was made up of particles about 3 μm in diameter connected to each other. The particle lamination was also seen in the vicinity of the peripheral surface, and a distinct density was not found in the structure. Because the diameter of the particles was large, and the lamination was three-dimensional, the voids could not be evaluated precisely with the SEM image; additionally, the porosity of the bulk layer and the membrane surface porosity of the peripheral surface were unmeasurable with the SEM image. The pure water permeability was 98.0 m³/(m² per day)/100 kPa at a water temperature of 25° C. The rejection of the Uniform Latex particle 0.083 μm in diameter was 93.4%, and the rejection of the Uniform Latex particle 0.049 μm in diameter was 72.1%. The separation performance was thus very broad. The tensile strength at break was 2.8 MPa, and the tensile elongation at break was 176%. Even though the amount of polyvinylidene fluoride concentration was increased by 2.25 times compared with Example 1, the tensile strength at break was almost the same, and the tensile elongation at break greatly decreased.

Example 2

25 wt % of a polyvinylidene fluoride resin (SOLEF6020®) was dissolved in 75 wt % of diethylene glycol monoethyletheracetate by stirring under nitrogen atmosphere at 159° C., thereby obtaining a high temperature dope. The obtained high temperature dope was ejected from a coaxial double-slit spinneret together with triethylene glycol, which served as a hollow-portion-forming agent. Through an air gap of about 15 mm, the dope was led to a cooling bath consisting of a 10° C. aqueous solution containing 40 wt % of the diethylene glycol monoethyletheracetate to be solidified. The resulting fiber was wound at 5 m/min to obtain a hollow fiber membrane. The obtained hollow fiber membrane was washed with water to completely remove the solvent, and then dried to obtain a hollow fiber membrane 1.3 mm in outer diameter and 0.7 mm in inner diameter.

The hollow fiber membrane was observed with an SEM. A net-like structure was seen in the cross-section of the membrane, and there were no 10 μm or greater macrovoids. A fine layer was formed from the outer layer to a depth of about 1 μm, while a homogeneous bulk layer was formed in the rest of the depth to the inner face. The porosity A of the bulk layer was 41%, and the membrane surface porosity B of the outer layer was 22%; that is, A was 1.9 times B. It was observed that the dense outer layer changed substantially discontinuously into the bulk layer. The pure water permeability was 85.4 m³/(m² per day)/100 kPa at a water temperature of 25° C. The rejection of the Uniform Latex particle 0.083 μm in diameter was 91.0%, and the rejection of the Uniform Latex particle 0.049 μm in diameter was 51.4%. The tensile strength at break was 2.8 MPa, and the tensile elongation at break was 304%.

Example 3

The same process as in Example 2 was performed to obtain a hollow fiber membrane 1.3 mm in outer diameter and 0.7 mm in inner diameter, except that the concentration of diethylene glycol monoethyletheracetate in the cooling bath was 20 wt %.

The hollow fiber membrane was observed with an SEM. A net-like structure was seen in the cross-section of the membrane, and there were no 10 μm or greater macrovoids. A dense layer was formed on the peripheral surface with a depth of about 1.5 μm, and a homogeneous bulk layer was formed in the rest of the depth of the membrane to reach the inner surface. The porosity A of the bulk layer was 39%, and the membrane surface porosity B of the peripheral surface was 8%; that is, A was 4.9 times B. It was observed that the dense outer layer changed substantially discontinuously into the bulk layer. The pure water permeability was 24.1 m³/(m² per day)/100 kPa at a water temperature of 25° C. The rejection of the Uniform Latex particle 0.039 μm in diameter was 95.2%, and the rejection of the Uniform Latex particle 0.028 μm in diameter was 39.1%. The tensile strength at break was 3.1 MPa, and the tensile elongation at break was 242%.

Example 4

32 wt % of a polyvinylidene fluoride resin (SOLEF6020®) was dissolved in 68 wt % of diethylene glycol monoethyletheracetate by stirring under nitrogen atmosphere at 155° C., thereby obtaining a high temperature dope. The obtained high temperature dope was ejected from a coaxial double-slit spinneret together with triethylene glycol, which served as a hollow-portion-forming agent. Through an air gap of about 15 mm, the dope was led to a cooling bath consisting of a 10° C. aqueous solution containing 30 wt % of the diethylene glycol monoethyletheracetate to be solidified. The resulting fiber was wound at 5 m/min to obtain a hollow fiber membrane. The obtained hollow fiber membrane was washed with water to completely remove the solvent, and then dried to obtain a hollow fiber membrane 1.3 mm in outer diameter and 0.7 mm in inner diameter.

The hollow fiber membrane was observed with an SEM. A net-like structure was seen in the cross-section of the membrane, and there were no 10 μm or greater macrovoids. A dense layer was formed on the peripheral surface with a depth of about 2.5 μm, and a homogeneous bulk layer was formed in the rest of the depth of the membrane to reach the inner surface. The porosity A of the bulk layer was 30%, and the membrane surface porosity B of the peripheral surface was 6%; that is, A was 5.0 times B. It was observed that the dense outer layer changed substantially discontinuously into the bulk layer. The pure water permeability was 11.1 m³/(m² per day)/100 kPa at a water temperature of 25° C. The rejection of the Uniform Latex particle 0.039 μm in diameter was 93.1%, and the rejection of the Uniform Latex particle 0.028 μm in diameter was 84.9%. The tensile strength at break was 7.5 MPa, and the tensile elongation at break was 309%.

Comparative Example 3

25 wt % of a polyvinylidene fluoride resin (SOLEF6020®) was dissolved in 75 wt % of propylene carbonate by stirring under nitrogen atmosphere at 120° C., thereby obtaining a high temperature dope. The obtained high temperature dope was ejected from a coaxial double-slit spinneret together with triethylene glycol, which served as a hollow-portion-forming agent. Through an air gap of about 15 mm, the dope was led to a cooling bath consisting of a 10° C. aqueous solution containing 40 wt % of the diethylene glycol monoethyletheracetate to be solidified. The resulting fiber was wound at 5 m/min to obtain a hollow fiber membrane. The obtained hollow fiber membrane was washed with water to completely remove the solvent, and then dried to obtain a hollow fiber membrane 1.3 mm in outer diameter and 0.7 mm in inner diameter.

The hollow fiber membrane was observed with an SEM. The net-like structure was not seen in the cross-section of the membrane, and the observed structure was made up of particles about 1 μm in diameter connected to each other. The pure water permeability was 280 m³/(m² per day)/100 kPa at a water temperature of 25° C. The rejection of the Uniform Latex particle 0.193 μm in diameter was 93.2%, and the rejection of the Uniform Latex particle 0.112 μm in diameter was 77.2%. The separation performance was thus very broad compared with Example 1. The tensile strength at break was 0.6 MPa, and the tensile elongation at break was 63%. They were both very low.

Example 5

25 wt % of a polyvinylidene fluoride resin (SOLEF6020®) was dissolved in 75 wt % of dipropylene glycol monomethyletheracetate by stirring under nitrogen atmosphere at 160° C., thereby obtaining a high temperature dope. The obtained high temperature dope was ejected from a coaxial double-slit spinneret together with triethylene glycol, which served as a hollow-portion-forming agent. Through an air gap of about 15 mm, the dope was led to a cooling bath consisting of a 10° C. aqueous solution containing 5 wt % of the dipropylene glycol monomethyletheracetate to be solidified. The resulting fiber was wound at 5 m/min to obtain a hollow fiber membrane. The obtained hollow fiber membrane was washed with water to completely remove the solvent, and then dried to obtain a hollow fiber membrane 1.3 mm in outer diameter and 0.7 mm in inner diameter.

The hollow fiber membrane was observed with an SEM. A net-like structure was seen in the cross-section of the membrane, and there were no 10 μm or greater macrovoids. A dense layer was formed on the peripheral surface with a depth of about 2.5 μm, and a homogeneous bulk layer was formed in the rest of the depth of the membrane to reach the inner surface. The porosity A of the bulk layer was 37%, and the membrane surface porosity B of the peripheral surface was 3%; that is, A was 12.3 times B. It was observed that the dense outer layer changed substantially discontinuously into the bulk layer. The pure water permeability was 9.8 m³/(m² per day)/100 kPa at a water temperature of 25° C. The rejection of the Uniform Latex particle 0.028 μm in diameter was 96.8%, and the rejection of the Uniform Latex particle 0.021 μm in diameter was 65.8%. The tensile strength at break was 3.1 MPa, and the tensile elongation at break was 286%.

Example 6

25 wt % of a polyvinylidene fluoride resin (SOLEF6020®) was dissolved in 75 wt % of triethyl phosphate by stirring under nitrogen atmosphere at 80° C., thereby obtaining a high temperature dope. The obtained high temperature dope was ejected from a coaxial double-slit spinneret together with triethylene glycol that serves as a hollow-portion-forming agent. Through an air gap of about 15 mm, the dope was led to a cooling bath consisting of a 10° C. aqueous solution containing 40 wt % of the triethyl phosphate to be solidified. The resulting fiber was wound at 5 m/min to obtain a hollow fiber membrane. The obtained hollow fiber membrane was washed with water to completely remove the solvent, and then dried to obtain a hollow fiber membrane 1.3 mm in outer diameter and 0.7 mm in inner diameter.

The hollow fiber membrane was observed with an SEM. A net-like structure was seen in the cross-section of the membrane, and there were no 10 μm or greater macrovoids. A dense layer was formed on the peripheral surface with a depth of about 2 μm, and a homogeneous bulk layer was formed in the rest of the depth of the membrane to reach the inner surface. The porosity A of the bulk layer was 40%, and the membrane surface porosity B of the peripheral surface was 18%; that is, A was 2.2 times B. It was observed that the dense outer layer changed substantially discontinuously into the bulk layer. The pure water permeability was 108 m³/(m² per day)/100 kPa at a water temperature of 25° C. The rejection of the Uniform Latex particle 0.112 μm in diameter was 98.8%, and the rejection of the Uniform Latex particle 0.083 μm in diameter was 23.1%. The tensile strength at break was 3.4 MPa, and the tensile elongation at break was 263%.

Industrial Applicability

The polyvinylidene fluoride hollow fiber microporous membrane of the present invention has a high permeability performance, a sharp separation characteristic, and high chemical and mechanical strength. The manufacture of the polyvinylidene fluoride hollow fiber microporous membrane does not use an environment-unfriendly solvent, and carries out a small number of steps at low cost. With these advantages, the polyvinylidene fluoride hollow fiber microporous membrane of the present invention is widely applicable for various purposes, such as for various water and wastewater treatments, in ultrapure water systems, for food and drink treatments, for the isolation of valuable resources, or for the pre-treatment of seawater desalination. The present invention thus greatly contributes to industry.

What is claimed is:

1. An anisotropic polyvinylidene fluoride hollow fiber microporous membrane comprising a polyvinylidene fluoride resin,
  wherein:
   (1) the hollow fiber microporous membrane does not include macrovoids, and has mainly a net-like structure;
   (2) the hollow fiber microporous membrane has a dense outer layer on an outer surface, and a homogeneous bulk layer that is internally adjacent to the outer layer and that has a coarser structure than the outer layer;
   (3) a porosity A of the bulk layer is at least 1.5 times a membrane surface porosity B of the outer layer;
   (4) the dense structure of the outer layer changes substantially discontinuously into the coarse structure of the bulk layer;

(5) the membrane surface porosity of the outer layer is not more than 40%, and the porosity of the bulk layer ranges from 20% to 60%; and (6) a tensile strength at break ranges from 2 MPa to 20 MPa, and a tensile elongation at break ranges from 200% to 500%.

2. A polyvinylidene fluoride hollow fiber microporous membrane according to claim 1, wherein the dense outer layer has a thickness not more than 3 μm.

3. A polyvinylidene fluoride hollow fiber microporous membrane according claim 1, wherein the polyvinylidene fluoride hollow fiber microporous membrane is used for water processing.

4. The polyvinylidene fluoride hollow fiber microporous membrane of claim 1, wherein a porosity A of the bulk layer is at least 1.7 times a membrane surface porosity B of the outer layer.

5. The polyvinylidene fluoride hollow fiber microporous membrane of claim 1, wherein the thickness of the bulk layer is at least 10 μm and at most 1000 μm.

6. The polyvinylidene fluoride hollow fiber microporous membrane of claim 1, wherein the membrane surface porosity of the outer layer is not more than 30%.

7. The polyvinylidene fluoride hollow fiber microporous membrane of claim 1, wherein the hollow fiber microporous membrane does not include macrovoids having a size of 10 μm or greater.

* * * * *